United States Patent [19]

Nimerick et al.

[11] 4,040,967

[45] Aug. 9, 1977

[54] METHOD OF FRACTURING SUBTERRANEAN FORMATIONS PENETRATED BY A WELL

[75] Inventors: Kenneth H. Nimerick; Benny E. Simpson, both of Tulsa, Okla.

[73] Assignee: The Dow Chemical Company, Midland, Mich.

[21] Appl. No.: 591,196

[22] Filed: June 27, 1975

Related U.S. Application Data

[62] Division of Ser. No. 487,512, July 11, 1974.

[51] Int. Cl.$^2$ .................... E21B 43/26; B01F 3/20; B01F 1/00
[52] U.S. Cl. ................... 252/8.55 R; 166/283; 166/308; 252/363.5; 252/384; 260/17 R; 260/17.4 ST; 260/29.6 RW; 260/29.6 WB; 260/895; 427/222; 428/407

[58] Field of Search ............... 252/8.55 R, 363.5, 384; 166/283, 308; 427/222; 428/407; 260/17.4 ST, 29.6 RW, 29.6 WB, 882, 895

[56] References Cited

U.S. PATENT DOCUMENTS

| | | | |
|---|---|---|---|
| 3,122,203 | 2/1964 | Hawkins | 252/8.55 X |
| 3,153,450 | 10/1964 | Foster et al. | 252/8.55 X |
| 3,297,583 | 1/1967 | Dierichs et al. | 252/363.5 |
| 3,402,137 | 9/1968 | Fischer et al. | 252/363.5 X |
| 3,455,714 | 7/1969 | Bishop et al. | 252/363.5 X |
| 3,779,914 | 12/1973 | Nimerick | 252/8.55 |
| 3,839,500 | 10/1974 | Dexter | 260/874 |

*Primary Examiner*—Herbert B. Guynn
*Attorney, Agent, or Firm*—Bruce M. Kanuch; G. H. Korfhage

[57] ABSTRACT

A water dispersible particulate organic polymer is coated with a polyvinyl lactam-containing polymeric material to provide a particulate material which is readily dispersible in aqueous solutions with a minimum of agglomeration of the water soluble polymer.

1 Claim, No Drawings

METHOD OF FRACTURING SUBTERRANEAN FORMATIONS PENETRATED BY A WELL

CROSS-REFERENCE TO RELATED APPLICATION

This is a division, of application Ser. No. 487,512 Filed July 11, 1974.

BACKGROUND OF THE INVENTION

It is well-known that various particulate water soluble high molecular weight organic substance agglomerate when wetted by an aqueous solution thus making it difficult to disperse the particles in an aqueous solution. These polymers are employed to thicken aqueous solutions, to increase their viscosity, to provide friction reduction properties, as flocculants, and for other functional purposes. Various methods have been developed as an aid for dispersing these high molecular weight substances in water. For example, in U.S. Pat. No. 2,879,268, it is taught to slightly cross-link a high molecular weight organic compound containing hydroxyl groups (e.g., cellulose ethers and starches) with small amounts of formaldehyde or a dialdehyde such as glyoxal. Agglomeration is substantially avioded when the substance is subsequently dispersed in an aqueous solution. U.S. Pat. Nos. 3,072,635 and 3,475,334 teach further refinements in such cross-linking methods and methods of fracturing subterranean formations employing such treated high molecular weight organic substances. It also has been suggested to employ surfactant coated particulate high molecular weight organic substances or to vary the particle size of the particulate materials to improve dispersibility in aqueous fluids. Although these known techniques are somewhat effective in increasing the dispersibility of such organic materials, they have certain drawbacks. For example, these methods generally cannot be employed to adjust the rate at which the organic materials disperse or dissolve to thereby thicken the aqueous solution. Furthermore, the methods disclosed in U.S. Pat. Nos. 2.879,268 and 3,072,635 require carefully controlled chemical reactions and are also limited to a very specific class of organic polymers.

The present discovery concerns a method whereby not only is the dispersibility of such high molecular materials improved, but control over dispersion and/or solubility can also be achieved. Moreover the invention is applicable to a wide variety of organic polymers.

SUMMARY OF THE INVENTION

A high molecular weight water soluble organic polymer in particulate form is coated with a polyvinyl lactam-containing polymeric material to improve the dispersibility of the high molecular weight polymer in aqueous solutions. Also, by varying the quantity of a comonomer which is copolymerized with the polyvinyl lactam-containing polymeric material and/or the quantity of coating placed on the particles the rate of viscosity increase caused by the particulate polymer going into solution in the aqueous solution can be controlled to some degree. The so treated material can be employed to prepare aqueous fluid for such uses as viscous fracturing fluids, plugging fluids, fluid loss additives and other similar utilities wherein thickened or viscous aqueous solutions are desired, as flocculating agents, friction reducing agents and the like. As employed hereinafter polyvinyl lactam means polyvinyl lactam-containing polymeric material as more fully defined hereinafter.

DETAILED DESCRIPTION OF THE INVENTION

High molecular weight organic materials which may be employed in the practice of the present invention include any particulate organic polymers which are water soluble and which upon dispersion or solubilization in an aqueous solution, increase the viscosity, thicken, reduce friction loss of the solution or are desired for some other functional purpose. Included by way of example are natural gums and various derivatives and modifications thereof, such as guar gum, various cellulosic derivatives such as cellulose ethers, derivatives of starch, acrylamide polymers and the like.

The polyvinyl lactam-containing polymeric materials which may be used in the present invention include all of the polyvinyl lactam-containing water-soluble polymers, copolymers and mixtures containing a minimum of 20% N-vinyl lactam.

Polymeric N-vinyl lactams, as exemplified by polyvinylpyrrolidone (PVP, poly-1-vinyl-2-pyrrolidone, poly-N-vinyl-2-pyrrolidone, poly-N-vinyl-α-pyrrolidone), are white powders or colorless, horn-like or glass-like materials with a high softening point and have the highly desirable property of being soluble in water. They are characterized by the following general structural formula:

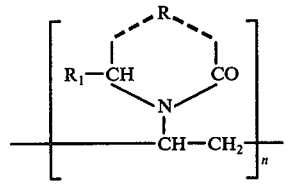

wherein R represents an alkylene bridge group necessary to complete 5-, 6- or 7-membered hetrocyclic ring systems, $R^1$ represents hydrogen or a lower alkyl group such as methyl or ethyl, and $n$ represents a number indicative of the extent of polymerization and is unually at least 3 or 4. They are obtained by polymerizing organic 5-, 6-, or 7-membered ring compounds containing in their rings the —NH—CO— group such as, for example, N-vinyl-2-pyrrolidone, N-vinyl-5, -4, and -3-methyl-2-pyrrolidones, N-vinyl-3,3-dimethyl-2-pyrrolidone, N-vinyl-2-pyrrolidone, N-vinyl-ε-caprolactam, N-vinyl-hexa-hydrophthalamidine and the like. Depending upon the extend of polymerization, they may have molecular weights ranging from at least about 300 up to 2,000,000 or more, and preferably from about 400 to about 70,000. Viscosity measurements are commonly used as an indication of the average molecular wieght of polymeric compositions, the instant polymers being characterized by a chain of carbon atoms to which the lactam rings are attached through their nitrogen atoms, as follows:

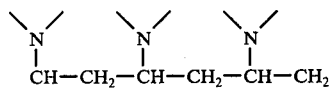

The K value (Finkentscher) of any particular mixture of polymers is calculated from viscosity data and is useful as an indication of the average molecular weight of such mixture. Its determination is fully described in "Modern Plastics," 23, No. 3, 157–61, 212, 214, 216, 218(1945).

The number of recurring polymer units enclosed by brackets in the foregoing general structural formula, indicated by $n$, or the extent or degree of polymerization, corresponds to a chain of roughly 4 to 20,000 momomer units or more. In actual practice, a mixture of polymeric molecules, each containing a different number ($n$) of monomer units, is always produced. These homo-polymers are readily prepared by the procedural steps given in U.S. Pats. Nos. 2,265,450, 2,317,804, and 2,335,454 in which working examples of species included within the above formula are given and which are incorporated herein by reference thereto.

Water-soluble copolymers operative in the instant invention are derived from polymerizable monomeric compositions containing at least about 20% by weight of an N-vinyl lactam. The proportion of N-vinyl lactam present in such polymerizable monomeric compositions will depend upon the amount and nature of the outer monomer or monomers, but should in all cases be at least sufficient to impart to the final copolymer the desired water-soluble property.

The followng includes a list of suitable monomers which may be copolymerized with the N-vinyl lactam for the production of suitable polymers: acrylonitrile, allyl alcohol, allyl acetate, ethylene, maleic anhydride, methyl methacrylate, vinyl acetate, vinyl chloride, vinyl carbonate, vinyl cyclohexyl ether, vinyl phenyl ether, vinyl stearate, acrylic acid, vinyl laurate, methyl vinyl ether, ethyl vinyl ether, isobutyl vinyl ether, diallyl phthalate, and the like.

The following table lists some monomeric compositions useful in the production of suitable water-soluble copolymers.

TABLE I

| | | Percent |
|---|---|---|
| (1) | N-vinyl-2-pyrrolidone | 70 |
| | Allyl alcohol | 30 |
| (2) | N-vinyl-2-pyrrolidone | 85 |
| | Diallyl phthalate | 15 |
| (3) | N-vinyl-2-pyrrolidone | 60 |
| | Vinyl ethyl ether | 40 |
| (4) | N-vinyl-2-pyrrolidone | 30 |
| | Vinyl methyl ether | 70 |
| (5) | N-vinyl-2-pyrrolidone | 75 |
| | Vinyl acetate | 25 |
| (6) | N-vinyl-2-pyrrolidone | 50 |
| | Acrylic acid | 50 |
| (7) | N-vinyl-2-pyrrolidone | 20 |
| | Maleic anhydride | 80 |
| (8) | N-vinyl-2-pyrrolidone | 94 |
| | Vinyl stearate | 6 |
| (9) | 3-methyl-N-vinyl-2-pyrrolidone | 87 |
| | Vinyl bromide | 13 |
| (10) | 3-methyl-N-vinyl-2-pyrrolidone | 87 |
| | Vinyl chloride | 13 |
| (11) | 4-methyl-N-vinyl-2-pyrrolidone | 88 |
| | Vinyl chloride | 12 |
| (12) | 3,3-dimethyl-N-vinyl-2-pyrrolidone | 91 |
| | Vinyl chloride | 9 |

It will be understood that the above-described copolymers are generally prepared in the same manner as the homo-polymers of the N-vinyl lactams and have similar properties with respect to water-solubility, K values and the like.

By varying the weight ratio of N-vinyl lactam to a comonomer such as vinyl acetate the rate at which the polyvinyl lactam film will dissolve in water and thus the rate at which the high moleclar weight organic polymer will dissolve can be controlled to some degree. For example, with higher N-vinyl lactam concentrations in a copolymer, faster rates of dissolution are possible.

Also, the amount of polyvinyl lactam employed to coat (i.e. thickness of the coating) such high molecular weight organic polymers can affect the rate of dissolution.

To coat the particulate high molecular weight organic polymers, the polyvinyl lactam is dissolved in a suitable solvent, such as a low molecular weight mono- or polyhydric alcohol, ether alcohol, ester, ketone, chlorinated hydrocarbon, amine, nitro paraffin or the like which is not a solvent for the high molecular weight organic polymer. The solution of polyvinyl lactam is then sprayed or otherwise dispersed onto a mass of the particulate high molecular weight organic polymer desired to be treated. The solvent is evaporated from the mass to coat the individual particles of organic polymer with polyvinyl lactam.

Specific solvents for polyvinyl lactam will depend on the composition of the particular polyvinylactam material employed and other well-known parameters, i.e., temperature, etc. Solvents such as methanol, ethanol, propanol, butanol, amyl alcohol, 2-ethyl-1-hexanol, cyclohexanol phenol, ethylene glycol, propylene glycol, glycerin, diacentone alcohol, diethylene glycol, trimethylene glycol, n-butyrolactone, methylene chloride, butylamine and nitro methane can be employed. It is generally preferred, because of ease of handling, etc., that a solvent be employed which can dissolve the maximum quantity of polyvinyl lactam desired at room temperature employing a minimum quantity of solvent.

The quantity of coating to be placed on the water soluble organic polymer will depend on such factors as the composition of the polyvinyl lactam employed; the particle size of the water soluble organic polymer; the desired delay in viscosity increase and the like. At a minimum, a sufficient quantity of coating should be applied so that the water soluble organic polymer can be readily dispersed in an aqueous solution without undue agglomeration. The amount of coating which is most effective for any particular system can be ascertained by conducting simple preliminary trials. The maximum amount of coating, of course, is that amount which then tends to provide aqueous solutions having characteristics, i.e., solubility rate, viscosity, which are more directly related to that effected by the coating than that of the water soluble polymer.

Following are examples of the practice of the present invention.

EXAMPLE 1

Samples of polyacrylamide in particulate form (20–25% hydrolyzed AP 273) were coated with various amounts of a vinylpyrrilidone-vinyl acetate copolymer containing approximately 50 percent by weight of N-vinyl-2-pyrrolidone and 50 percent by weight of vinyl acetate. The various samples were dispersed in water in an amount equivalent to about 100 pounds of the coated polyacrylamide to 1000 gallons of fresh water at a temperature of 80° F. The resultant samples were mixed for one minute on a Waring blender at low speed. The viscosity of the resulting samples were then determined at various time intervals with a Fann Model 35 viscometer at 100 rpm. The amount (as percent by weight of the total weight of coating and the polyacrylamide) of coating on the particulate polyacrylamide and the resulting viscosity determinations are set forth in the following Table II. The polyacrylamide powder was coated by the following procedure. About 200 grams of the polyacrylamide powder was placed in a one gallon container tilted at approximately 20 degrees from horizontal and rotated from 15 to 20 revolutions per minute. Ethyl alcohol solutions of the vinylpyrrolidone-vinylacetate copolymer were prepared containing from about 2.5 to 23 percent by volume of the polymer. This solution of polymer was placed in a jet packed aerosol spray apparatus and the resulting samples of polyacrylamide were sprayed for a certain time period to prepare a coated polymer containing the desired weight percent coating. The coated polyacrylamide was then allowed to tumble dry employing a spatula to prevent caking on sides of the can. The polyacrylamide treated powder was then removed from the can and dried in a vacuum oven at about 150° F. for 2 hours.

It was observed upon dispersing the polyacrylamide into water that the polymers which were treated with the polyvinylpyrrolidone dispersed much more easily than the uncoated polymer even under conditions of limited agitation.

TABLE II

| Coating Weight Percent | Fann 35 Viscosity Measurement (RIBI) at Time Intervals in Minutes | | | | | |
|---|---|---|---|---|---|---|
| | 2 | 3 | 5 | 10 | 20 | 30 |
| 0 | 183 | 183 | 186 | 210 | 246 | 252 |
| 0.2 | 174 | 177 | 192 | 246 | 267 | 270 |
| 1.0 | 159 | 162 | 186 | 249 | 276 | 282 |
| 5.0 | 132 | 132 | 150 | 231 | 321 | 321 |

An improved method of fracturing subterranean formations comprises coating a water soluble organic polymer such as polyacrylamide, a cellulose ether or the like with an effective amount of a polyvinyl lactam to prevent the agglomeration of the water soluble polymer when dispersed in an aqueous based fracturing fluid. If desired, the water soluble polymer is coated with a sufficient quantity of polyvinyl lactam to both increase the dispersibility of the water soluble polymer and delay the solution or hydration of the water soluble polymer so that the viscosity of the aqueous fracturing fluid does not reach near its maximum until just prior to the fluid reaching the formation face to be fractured. Propping agents are generally employed in fracturing techniques and, therefore, the viscosity of the fluid should also be sufficient to carry particulate propping agents down the well bore and into the fractures formed in the formation. By practicing the latter embodiment of the invention aqueous fracturing fluids can be prepared which can initially be pumped at lower viscosities, thus reducing the pumping load. Also higher effective viscosities can be employed during the actual fracturing of the formation thus permitting the opening of larger and longer fractures. Thus, the invention not only permits easier and quicker dispersion of water soluble polymers into fracturing fluids but also enhances other characteristics of the fracturing technique.

Standard fracturing equipment and techniques can be employed in practicing the invention.

What is claimed is:

1. In a method of fracturing subterranean formations penetrated by a borehole, wherein an effective amount of a particulate water soluble organic polymer selected from the group consisting of natural gums and derivatives thereof, cellulosic derivatives, derivatives of starch, and polyacrylamide, is introduced into an aqueous liquid to thicken the liquid. said thickened liquid then being employed as a fracturing fluid, the improvement which comprises:

a. introducing said polymer into the aqueous liquid as a particulate coated with an efective quantity of a water soluble polyvinyl lactam, said polyvinyl lactam being selected from the group consisting of a polymer corresponding to the formula

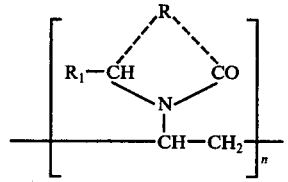

wherein R is an alkylene group containing a sufficient number of carbon atoms to form a heterocyclic ring containing from 5 to 7 members, $R_1$ is hydrogen or a lower alkyl group and n is sufficient to provide a polymer having a molecular weight ranging from about 300 to 2,000,000 or a copolymer containing at least 20 percent by weight of N-vinyl lactam corresponding to the above formula and at least one other organic monomer to provide a copolymer having a molecular weight ranging from about 300 to 2,000,000, to increase the dispersibility of the water soluble organic polymer into the aqueous liquid; and b. introducing a sufficient quantity of said resulting thickened aqueous liquid into said borehole and in contact with said formation under sufficient pressure to fracture said formation.

* * * * *